United States Patent [19]

Issel et al.

[11] Patent Number: 5,271,901
[45] Date of Patent: Dec. 21, 1993

[54] DEVICE HAVING A DIFFUSION SENSOR HOSE FOR DETECTING A LEAK

[75] Inventors: Wolfgang Issel, Karlsruhe; Peter Jax, Erlangen; Wilhelm Leuker, Pinzberg, all of Fed. Rep. of Germany

[73] Assignee: Siemens Aktiengesellschaft, Munich, Fed. Rep. of Germany

[21] Appl. No.: 921,840

[22] Filed: Jul. 29, 1992

[30] Foreign Application Priority Data

Jul. 31, 1991 [DE] Fed. Rep. of Germany ....... 4125373

[51] Int. Cl.$^5$ .............................................. G01N 7/12
[52] U.S. Cl. ........................................ 422/83; 422/88; 422/94; 405/128; 73/40.5 R; 73/40.7; 436/3; 436/144
[58] Field of Search ............... 405/128; 422/83, 88, 422/58, 94; 436/3, 144; 73/40.5, 40.7

[56] References Cited

U.S. PATENT DOCUMENTS

| | | | |
|---|---|---|---|
| 3,977,233 | 8/1976 | Issel | 73/40.5 R |
| 3,995,472 | 12/1976 | Murray | |
| 4,068,021 | 1/1978 | Allman | 422/83 X |
| 4,112,417 | 9/1978 | Himeno | 73/495 X |
| 4,303,612 | 12/1981 | Sonley | 422/94 |
| 4,709,577 | 12/1987 | Thompson | 73/40.7 |
| 4,710,353 | 12/1987 | Tanaka et al. | 436/3 X |
| 4,846,604 | 7/1989 | Holtmann | 405/128 |
| 5,046,353 | 9/1991 | Thompson | 73/40.7 |

OTHER PUBLICATIONS

English translation of Siemens publication "Leak Detection and Location System" (LEOS), Jul. 1991.
"Long-Term Monitoring of Landfills with LEOS", Siemens MG-UWU Group, pp. 1-5.
"Leak Detection and Location System" LEOS, Siemens MG-UWU Group, pp. 1-11.
Siemens publication, "LEOS Lechage-Erkennungs-und-Ortung system", Jul. 1991; No. A-19100-U65-3-A224-V1.

Primary Examiner—James C. Housel
Assistant Examiner—Harold Y. Pyon
Attorney, Agent, or Firm—Herbert L. Lerner; Laurence A. Greenberg

[57] ABSTRACT

A device for detecting a medium includes a sensor hose to be laid at a medium to be detected. A material is disposed at least in the vicinity of the sensor hose. The material reacts when in contact with the medium to be detected to produce a substance being capable of diffusion and being detectable.

16 Claims, 1 Drawing Sheet

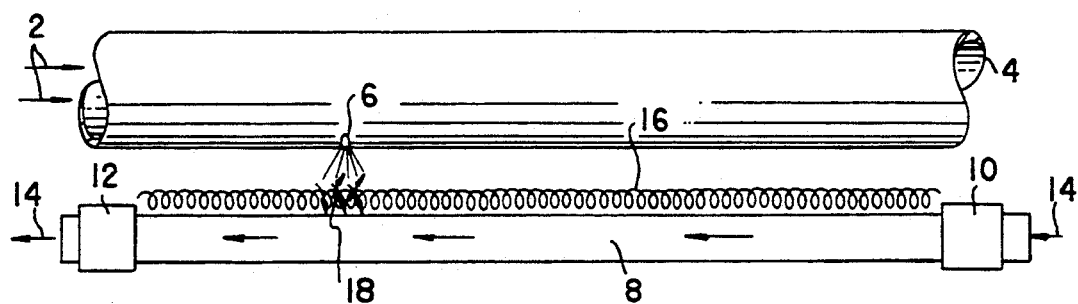
FIG.1
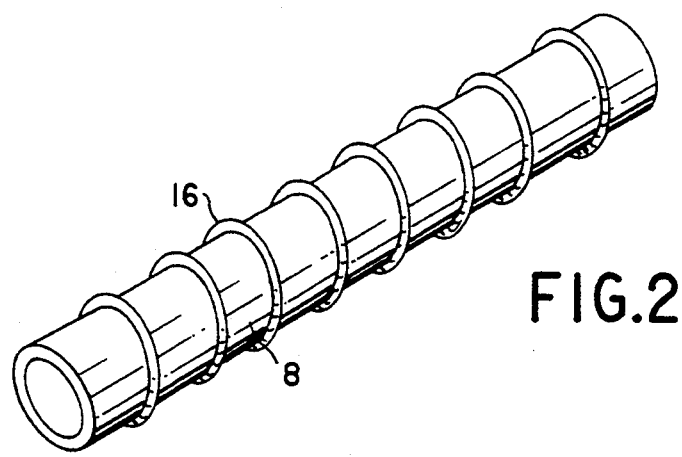
FIG.2
FIG.3
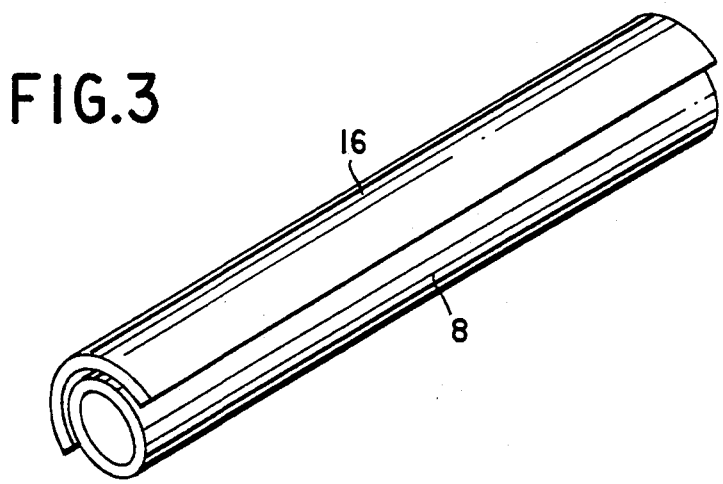

DEVICE HAVING A DIFFUSION SENSOR HOSE FOR DETECTING A LEAK

The invention relates to a monitoring device having a sensor hose or tube that can be laid at a medium to be monitored. The invention is used primarily in monitoring pipelines of chemical plants.

A device for sealing off a garbage dump or landfill and for detecting and locating leaks is known from a brochure of the firm Siemens entitled "Deponie-Langzeitüberwachung mit LEOS" [Long-term Dump Monitoring with LDLS], order number A 19100-U653-A222, July 1990. The garbage dump or landfill is provided with a watertight film sealing sheet or "seal" which is especially made of plastic. The seal may be disposed underneath the garbage mound as a base seal, so that pollutants cannot travel into the groundwater. The seal can also be laid on top of the garbage mound as a surface seal, to prevent the entry of rainwater and therefore to prevent the leaching of pollutants out of the garbage mound. In order to provide early detection of a leak or a defective point in the seal, the known device provides for the laying of so-called sensor or LDLS hoses, specifically on the side of the seal facing away from the garbage mound. LDLS stands for Leakage Detection and Location System. The LDLS hoses, which are laid in meandering patterns, are filled with air and have walls that are permeable to various substances present in the dump, are connected to a central monitoring system. If the seal is placed under the garbage mound, a leak in it is located by detecting substances dissolved in the seepage water. If the seal placed on top of the garbage mound, a leak in it is detected by detecting rising fermentation gases.

An LDLS hose and a device for operating the same are known from German Patent DE-PS 24 31 907, corresponding to U.S. Pat. No. 3,977,233. That device involves a hose that is permeable to certain substances. A pump is disposed at one end of the hose. Separate volumes of a transport medium, such as individual volumes of gas or especially air, are pumped through the hose in succession at intervals over time with the pump. In that way, there is a flow through the hose at regular time intervals, in other words at a constant frequency, for a certain period of time each time. On the other end of the hose are sensors that are sensitive to the substances to be detected, such as pollutants. If such a substance reaches the surroundings of the hose, it penetrates the hose. At the next time that the transport medium is pumped, the location at which the substance entered the hose between two flushing processes can be determined precisely from the difference between the time that the pump was turned on and the time that the sensors responded. The quantity of the substance can also be determined.

U.S. application Ser. No. 730,619, filed Jul. 16, 1991, discloses an element for sealing and monitoring a body, in particular a mound of a waste dump, by means of a control chamber or space. That element is based on the recognition that it is useful to create increased protection with a double barrier. The element is useful for both the base seal and the top seal in a dump. The element is also based on the thought that it is useful to make the structure in such a way that measuring instruments can be used to detect whether there is a leak in one barrier or the other, and where the leak is located. The element includes two seals for that purpose, which are spaced apart from one another by support elements. At least one channel is formed between the seals and the support elements, which have an entry opening and an outlet opening for a medium, such as air. The channel is constructed as, or includes, a permeable LDLS hose. At least one sensor, such as a sensor for liquid vapor and additionally a sensor for gas, can be connected to the outlet opening. The two seals are joined tightly to one another, leaving the entry and outlet opening of the channel free at the edges, so that a control chamber is formed. The support elements are formed of a flow-permeable but flow-hindering (largely homogeneous) material.

It is a requirement of the LDLS measuring process that the substance to be detected in the detector or sensor be capable of diffusing into the sensor hose in an adequate concentration, and that it be indicated by the detector or sensor of the measuring system after being transported by the transport medium. That requirement cannot be met by a substance with a low diffusion. Nor can it be met for an aqueous substance, such as when monitoring alkaline solutions, acids, or water in remote heating lines or similar water networks, in which only water vapor diffuses into the permeable hose. Due to the presence of the normal moisture in the soil, the last case involves an unmonitorable underground effect, so that there is not adequate certainty of detection in the case of a leak.

It is accordingly an object of the invention to provide a device having a sensor hose for monitoring a medium, which overcomes the hereinafore-mentioned disadvantages of the heretofore-known devices of this general type and which can operate with increased diffusion.

The invention is based on the concept that a new substance which is capable of diffusion can be produced by suitable provisions, with the aid of the medium to be monitored as it emerges from a leak, so that the new substance penetrates the sensor hose and is carried to the detector or sensor responding to it by the transport medium.

With the foregoing and other objects in view there is provided, in accordance with the invention, a device for monitoring a medium, comprising a sensor hose to be laid at a medium to be monitored, and a material disposed at least in the vicinity of the sensor hose, the material reacting when in contact with the medium to be monitored to produce a substance being capable of diffusion and being detectable.

In accordance with another feature of the invention, the substance is diffusible into the sensor hose.

In accordance with a further feature of the invention, the substance that is capable of diffusion and can be detected is a gas, such as hydrogen. Suitable detectors are available for detecting that substance. Hydrogen also penetrates the known sensor hoses relatively easily. Hydrogen or another gas can be generated by the action of an acid, for instance.

In accordance with an added feature of the invention, the material is a metal such as zinc, which is in the form of a wire that may be wound onto the sensor hose, especially helically.

In accordance with an additional feature of the invention, the material is applied to the sensor hose as a foil.

In accordance with yet another feature of the invention, the material is laid next to, on top of, beside and/or parallel to the sensor hose.

In accordance with yet a further feature of the invention, the sensor hose is separated from the medium to be monitored defining a space therebetween, and the material is disposed in the space.

In accordance with yet an added feature of the invention, there is provided a pump connected to the sensor hose, and at least one detector connected to the sensor hose for the substance being detectable and being capable of diffusion.

In accordance with yet an additional feature of the invention, the medium to be monitored is carried in a pipeline.

The invention can be used especially advantageously in monitoring pipelines in chemical plants, and particularly for monitoring acids or alkaline solutions. Therefore, in accordance with a concomitant feature of the invention, the medium to be monitored is an acid or an alkaline solution.

However, the invention can also be employed in the field of monitoring garbage dumps. In fact, with suitable materials, it is also possible to detect water in a control chamber located between two of the aforementioned sealing sheets.

Other features which are considered as characteristic for the invention are set forth in the appended claims.

Although the invention is illustrated and described herein as embodied in a device having a sensor hose for monitoring a medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF DRAWINGS

FIG. 1 is a fragmentary, diagrammatic, side-elevational view of a device for monitoring a medium in which a sensor hose is used, for which a substance that is capable of diffusion and detection is produced in the event of a leak;

FIG. 2 is a perspective view of a sensor hose with a reaction material in the form of wound-on metal wire; and FIG. 3 is a perspective view of a sensor hose with a reaction material applied in the form of a foil.

Referring now to the figures of the drawing in detail and first, particularly, to FIG. 1 thereof, it is seen that a medium 2 to be monitored, for instance an acid, is carried in a pipeline 4. Through the use of the illustrated device, monitoring is performed as to whether or not the pipeline 4 might possibly have a leak 6, through which the medium 2 escapes into the environment. The illustrated monitoring device substantially includes a sensor hose or tube 8 that is laid parallel to the pipeline 4; a pump 10 on one end of the sensor hose 8; and a detector or sensor 12 on the other end, for a substance to be detected. With the aid of the pump 10, a transport medium or vehicle 14, such as scrubbed air, is pumped through the sensor hose 8, for a certain period of time on each occasion.

An important feature is that a material 16 which is disposed in the vicinity of the sensor hose 8, reacts with the escaping medium in the event of leakage from the leak 6. In this reaction, it produces a substance 18 which is capable of diffusion with respect to the sensor hose 8 and is detectable by the detector 12.

In particular, the substance 18 may be a gas, such as hydrogen, and the medium 2 to be monitored may be an acid or an alkaline solution, in particular.

FIG. 1 shows that the reaction material 16 may be a coiled wire, which is laid parallel to the sensor hose 8. In particular, the material 16 may be a metal. With respect to producing hydrogen, zinc is especially suitable for monitoring an acid pipeline 4.

FIG. 1 also shows that the material 16 is preferentially located in the space between the sensor hose 8 and the pipeline 4 to be monitored.

The sensor hose 8 may be constructed in a known manner as an LDLS hose. Accordingly, it can surround a wire mesh. Depending on the number of substances to be detected, one or more detectors 12 will be provided.

FIG. 2 shows a version in which the material 16 is wound onto the sensor hose 8 in the form of a wire. The wire may be applied spirally or helically, in particular. Naturally, spaced-apart metal rings may be used instead. However, the spacing of such rings has some effect on the locational resolution in finding the leak 6. In principle, an elongated wire may also be laid parallel to the longitudinal axis of the sensor hose 8 and fixed in place.

FIG. 3 shows an embodiment in which the material 16 is applied to the sensor hose 8 in the form of a foil. This foil 16 is in the form of a half-cylinder. It can be seen that a small spacing between the sensor hose 8 and the foil 16 may be provided.

Depending on the medium 2 and the material 16, the substance 18 being produced may have particularly good diffusion performance, so that even small leaks 6 can be detected with adequate signal certainty.

We claim:

1. A device for detecting a medium, comprising means for detection of a substance, an elongated diffusion sensor hose coupled at an end thereof to the detection means, and a reaction material disposed adjacent and along said sensor hose, said material reacting when in contact with the medium to be detected to produce a substance capable of diffusion into said hose and detectable by said detection means, and means for carrying the substance through said hose to said detection means.

2. The detecting device according to claim 1, wherein said substance be capable of diffusion and being detectable is a gas.

3. The detecting device according to claim 2, wherein said substance is hydrogen.

4. The detecting device according to claim 1, wherein the medium is selected from the group consisting of an acid and an alkaline solution.

5. The detecting device according to claim 1, wherein said material is in the shape of a wire.

6. The detecting device according to claim 5, wherein said material is a metal.

7. The detecting device according to claim 1, wherein said material is a metal.

8. The detecting device according to claim 6, wherein said material is zinc.

9. The detecting device according to claim 7, wherein said material is zinc.

10. The detecting device according to claim 1, wherein said material is wound onto said sensor hose.

11. The detecting device according to claim 10, wherein said material is a helically wound wire.

12. The detecting device according to claim 1, wherein said material is applied to said sensor hose as a foil.

13. The detecting device according to claim 1, wherein said material is laid beside and parallel to said sensor hose.

14. The detecting device according to claim 1, wherein said sensor hose is separated from a container storing the medium to be detected defining a space therebetween, and said material is disposed in said space.

15. The detecting device according to claim 1, wherein said carrying means include a pump connected to said sensor hose.

16. The detecting device according to claim 1, wherein the medium to be detected is carried in a pipeline.

* * * * *